United States Patent

[11] 3,582,915

[72] Inventor Woo F. Chow
Horsham, Pa.
[21] Appl. No. 867,435
[22] Filed Oct. 16, 1969
[45] Patented June 1, 1971
[73] Assignee Sperry Rand Corporation
New York, N.Y.
Continuation of application Ser. No. 503,363, Oct. 23, 1965, now abandoned.

[54] ASSOCIATIVE AND RANDOM ACCESS DEVICE
16 Claims, 8 Drawing Figs.

[52] U.S. Cl. 340/174
[51] Int. Cl. G11c 15/00, G11c 11/14
[50] Field of Search 340/174; 307/88

[56] References Cited

UNITED STATES PATENTS

| | | | |
|---|---|---|---|
| 3,466,639 | 9/1969 | Apicella, Jr. et al. | 340/174 |
| 3,299,409 | 1/1967 | Herman | 340/174X |
| 3,300,760 | 1/1967 | Franks, Jr. et al. | 340/174X |
| 3,408,635 | 10/1968 | Lee | 340/174 |

*Primary Examiner*—Stanley M. Urynowicz, Jr.
*Attorneys*—Charles C. English, Rene A. Kuyers and Griffin & Branigan

ABSTRACT: There is disclosed an all magnetic memory arrangement which operates in a search memory mode or alternatively in a random access mode. Each mode utilizes essentially the same memory elements.

INVENTOR
WOO F. CHOW

BY Rene A. Kuypers
ATTORNEY

ASSOCIATIVE AND RANDOM ACCESS DEVICE

This is a Continuation Application of Ser. No. 503,363 filed Oct. 23, 1965 now abandoned.

This invention relates in general to a computer device. In particular, this invention relates to a computer device which searches information in either an associative memory mode or in a random access memory mode.

Information is searched in an associative memory by means of a search criterion which interrogates every memory location for specified information. This is opposed to a conventional digital computer device which locates certain information by means of an address. When certain information required by the search criterion is found in a computer employing an associative memory, it is designated as a match. During an associative memory search cycle, many matches may be located which correspond to the search criterion and hence it is required to resolve these matches (locate the addresses) by means of a match resolver. This is required since an address decoder can not resolve these matches and therefore it is not utilized with an associative memory device.

Accordingly, it is an object of this invention to provide a new and improved computer device which operates in the associative memory mode as well as the random access memory mode;

It is another object of this invention to provide a new and improved associative memory incorporating a match resolver technique.

It is another object of this invention to provide a new and improved means for reading and writing information out of and into a random access memory.

It is a feature of this invention to provide an associative memory device that incorporates a search cycle wherein every memory location is interrogated for specified information. When the required information is found in accordance with the search criterion, the results (i.e., a signal indicating a match or a mismatch) are stored in a flag register. The address or addresses of the matched words are then resolved. This is referred to as the match resolver operation.

It is another feature of this invention for the associative memory to also operate as a random access device. Accordingly when a certain address is required for reading out or writing in information, the address becomes the search criterion. Therefore, when a match has been obtained between the required address and the located address, a flag register will be set indicating that a match has been obtained. It should be noted that when searching for an address which is considered as the search criterion there will only be one match, whereas when a search criterion is used in an associative memory mode, many matched words may be obtained. Information may be read out or written into the memory by reading out of the flag register. The reading out of the flag register sends current down the required word line. If a memory readout operation is required, the current supplied by the flag register provides a magnetic field that causes all the bits of a word which are located along a plated wire memory element to be read out. On the other hand, if a write operation is required, the current supplied by the flag register provides a steering field that enables a "1" or a "0" to be written into a particular memory location.

The novel features that are considered characteristic of this invention are set forth with particularity in the appended claims. The invention itself, however, both as to its organization and method of operation, as well as additional objects and advantages thereof, will thus be understood from the following description and considered in conjunction with the accompanying drawings wherein:

Figure 1:
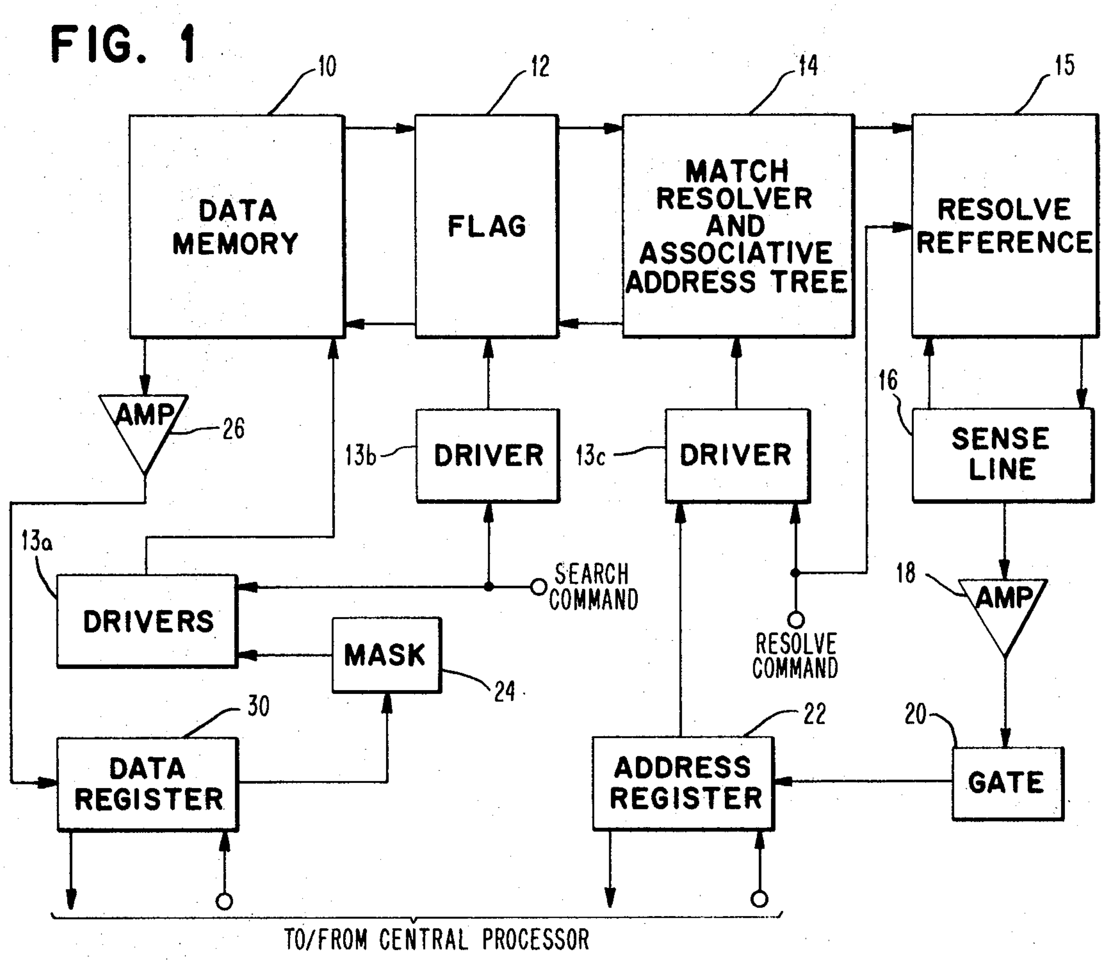
FIG. 1 depicts the block diagram arrangement for a part of a computer operating in the associative or random access mode.

Referring now to the drawings and in particular to FIG. 1, the computer arrangement will be discussed firstly as an associative memory device. As briefly discussed above, an associative memory searches for information by first establishing an associative or search criterion. This means that the associative memory criterion requires that certain information be searched, such for example as, all people with the name Smith or, all people having a Social Security Number ending with the numbers 038. It can be appreciated that many words in the memory may correspond to these criterion. The associative criterion is generated in FIG. 1 by the data register 30. The signals required to insert the required information into the data register 30 are generated in the computer processor (not shown). The associative criterion in conjunction with the mask 24 causes the required drive lines incorporated in the memory 10 to be energized by the driver circuit 13*a*.

The information stored in the memory 10 which corresponds to the associative criterion is called a match. Every location in the memory 10 which has a match is recorded in the flag register 12. In other words, the flag register records the results of a search. After the flag register 12 has recorded the results of the search, it is necessary to determine the address or addresses of the flag wherever a match occurred.

It is the function of the match resolver 14 when operated in conjunction with the flag register 12, the sense circuit 16, the amplifier circuit 18, the gate circuit 20 and the address register 22 to determine the address of the flag, which has detected the matched words. The address register 22 may be a group of flip-flops which store the results of the resolve operation. The match resolve operation will be explained in greater detail with reference to FIG. 2.

The instant invention can be utilized not only as an associative memory but also as a random access memory device. Thus, if it is required to locate a certain word in the memory 10, the address register which includes a group of flip-flops is set in accordance with an address which may be given by the central processor. The match resolver 14 is arranged into an address tree which will correspond to a given address stored in the address register. According to this arrangement, the address from the address register 22 is treated or considered as the search criterion. The address information entered into the address register 22 is generated in the central computer processor (not shown).

When a match is obtained for the required address, the result will be entered into the flag register 12. If the memory cycle calls for a read operation, the flag register 12 will cause current to flow in the required word line. This current will cause a word to be read out of the memory 10 and each bit will be selectively amplified by the amplifier circuit 26. The amplified bits will be of sufficient magnitude to set a flip-flop in the data register 30. Similarly, if it is required that a word be written into the memory 10 at a certain location, the flag register will supply the steering current for certain drive lines which are selectively energized by the data register 30, the driver circuit 28 and the mask 24.

ASSOCIATIVE MEMORY MODE AND MATCH RESOLVER OPERATION

Figure 2:
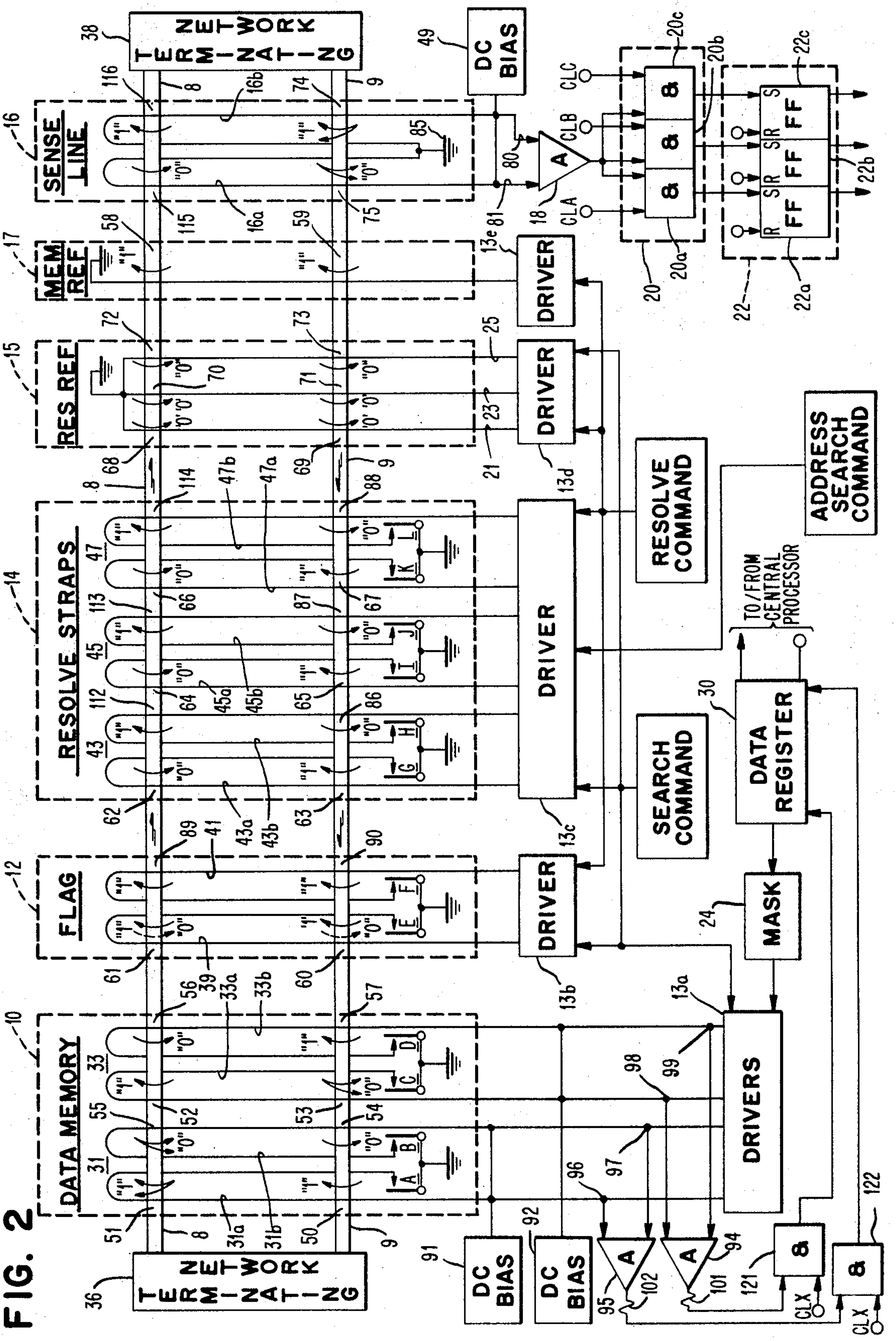
FIG. 2 shows the structural arrangement for the device of FIG. 1.

Reference is now made to FIG. 2, which shows in greater detail the invention of FIG. 1. The arrangement of FIG. 2 is composed essentially of a plurality of horizontally arranged plated magnetizable wires, only wires 8 and 9 being shown for the sake of simplicity. One end of the plated wires 8 and 9 are connected to the terminating network 36 and the other ends are connected to the terminating network 38. The terminating networks 36 and 38 may represent a ground bus so that a complete circuit is provided for each plated wire.

In a preferred embodiment, the plated wires 8 and 9 are 5-mil diameter beryllium copper wire substrates having a thin magnetic film formed on the surface thereof. The thin magnetic film is electroplated on the wire substrate with approximately a 10,000 Angstrom thickness of Permalloy (i.e., nickel-iron alloy). The Permalloy film has an approximate ratio of 80 percent nickel and 20 percent iron. The Permalloy film is electroplated in the presence of a circumferential magnetic field that establishes a uniaxial anisotropy axis at right angles (i.e., around the circumference) to the longitudinal axis of the wire along its length. The uniaxial anisotropy establishes easy and hard directions of magnetization and the magnetization vectors of the thin film are normally oriented in one of two equilibrium positions along the easy axis, thereby establishing bistable states necessary for binary logic operations.

Arranged substantially orthogonal to the plated wires 8 and 9 are a plurality of drive lines 31 and 33, for example, which also act as sense lines. Each of the lines 31 and 33, for example, is a double strap arrangement whose operation may be summarized as follows. The lines 31 and 33 are composed of two single turn solenoids which are joined together at one end. Thus, the plated wires 8 and 9 are positioned between the single-turn of the solenoid 31*a* as well as between the single turn of the solenoid 31*b*. Each of the single turn solenoids 31*a* and 31*b* has a switch so that they may be energized singly or together. When the line 31 is used singly for a memory write-in operation, solenoid 31*a* or 31*b* is selectively energized by means of switch A or B (switch A or B can be placed at either end of the strap line). However, when the drive line 31 is used as a sensing device, both switches, A and B are closed. In all other mechanical respects, the plated wire in conjunction with an orthogonally arranged drive strap appears in a conventional manner.

The data memory 10 is adapted to store a plurality of data or information bits (i.e., "0"s or "1"s). The data bits are stored along solenoid 31*a* and 33*a* of straps 31 and 33, respectively. The complements of the information bits stored along solenoid 31*a* and 33*a* are stored along solenoids 31*b* and 33*b*. Thus, if the information at the bit location 51 along solenoid 31*a* is a "1," then the information directly opposite the "1" at location 55 is a "0." This may be accomplished by the vector orientation around a particular plated wire. Thus, the "1" information bit at location 51 is magnetized clockwise around the plated wire when viewed from terminating network 38, and the "0" complementary bit at location 55 is magnetized in a counterclockwise direction.

The bit locations 60 and 61 of the flag register 12 are all reset to the "1" position indicated by the clockwise orientation of magnetization vectors along plated wires 8 and 9 before the resolve operation begins. The bit locations 89 and 90 of the flag register are oriented permanently to the "1" position during the original fabrication process. The bit locations 60 and 61 are reset by combining the memory reference bit locations 58 and 59, and flag bit locations 89 and 90, as will be more fully explained.

The resolve straps comprising the match resolver 14 are arranged to resolve eight addresses as an example, namely addresses 0–0–0 to 1–1–1. For ease of understanding, only addresses 0–0–0 and 1–1–1 are shown. Thus, the address 0–0–0 is located along plated wire 8 wherein the first digit of the address is located at bit position 62, the second digit a bit position 64 and the third at bit position 66. The complements of the address digits are located directly opposite and are located at the bit locations 112, 113 and 114. In like manner, the address 1–1–1 is located along plated wire 9 and the first digit is located at bit position 63, the second digit at bit position 65 and the third digit at bit position 67. The complements of these digits are located respectively, at bit positions 86, 87 and 88. While only eight addresses (i.e. address 0–0–0 to 1–1–1) are designated in the match resolver 14, it should be understood that as many addresses as required by the memory 10 capacity may be utilized in accordance with the instant invention.

Initially, the bits comprising the resolver reference 15 are all reset to the "0" position in a manner similar to the resetting the flag bit positions. Thus, the bits 68, 70 and 72 along plated wire 8 and bits 69, 71 and 73 along plated wire 9 are all magnetized in the counterclockwise direction as viewed from terminating network 38. The bits at location 58 and 59 of the memory reference 17 are initially reset and constantly held to the "1" position as represented by the clockwise orientation of the vectors by the original fabrication of this memory.

The sense line 16 is similar to that described with respect to the lines comprising the data memory 10. The difference to be noted between the sense line 16 and the lines 31 and 33 is that in the latter case, the information in the memory 10 is frequently altered since the data stored is changing, whereas the "0" and "1" bits of the sense line 16 remains unaltered throughout the operation of the device. Hence, the locations 75 and 115 are always magnetized as "0"s and 74 and 116 are always magnetized as "1"s. A complete description of the operation of the sense line 16 can be found in the copending application of Woo F. Chow, Ser. No. 483,662, filed Aug. 30, 1965 now Pat. No. 3,504,358.

Let us assume that the central processor (not shown) of the computer establishes the search criterion 1–0. This means that a search is to be made in the memory 10 for all information that has this particular coding arrangement. The coding arrangement 1–0 may represent, by way of example, the last two digits of a social security number or of an automobile license plate number. The search criterion 1–0, which emanates from the central processor, is stored in the data register 30.

For the sake of simplicity, only two-data bits are shown along each of the word lines 8 and 9. Thus, the data 1–1 is stored along plated wire 8 and the data 1–0 is stored along plated wire 9. The memory 10 is searched in accordance with the search criterion one bit at a time as soon as a search command signal is given. Therefore, the drive line 31*a* is first energized by the bit-strap driver circuit 13*a*. The driver circuit 13*a* is selected by the mask 24 which blocks the energizing of all other drive lines. The switch A is therefore closed. This causes current to flow through the drive line 31*a* from the driver circuit 13*a* to ground. Simultaneously with the energizing of the data line 31*a*, the resolve reference line 21 is energized by its associated driver circuit 13*d*. When the bits at locations 50 and 69 are read out together, there will be no output signal produced along plated wire 9 since the two induced signals cancel one another. It will be recalled that the flag register 12 stores the results of the search. Hence, the flag register 12 is first conditioned to receive the results of the search and is done in the following manner. The drive line 39 is energized by the driver 13*b* in conjunction with closing the switch E. Current is then conducted from the driver 13*b* to ground. The flag bit positions 60 and 61 are therefore in a condition to be switched in the event that current is induced in plated wires 8 and 9 indicating that there is a mismatch. The transfer of information to the flag register 12 makes use of the technique of bit current steering and is fully described in the copending patent application of Woo F. Chow, Ser. No. 466,904, filed June 25, 1965 now Pat. No. 3,487,380.

Thus, since there is a match when searching bit 50, no current is induced in plated wire 9 and hence, the bit at location 60 of the flag register 10 retains its magnetization in the clockwise direction. In like manner, the reading out of data bit 51 in conjunction with resolve reference bit 68 of the resolve reference 15 by energizing line 31*a* and the reference line 21 produces a match and the voltages will cancel in plated wire 8. Therefore, the flag bit 61 remains magnetized in the clockwise direction.

The second data bit of the search criterion is a "0" and this is searched in the memory 10 by energizing the complement line 33*b* in conjunction with the resolve reference line 21. In other words, in searching for a "1," the lines 31*a* and 33*a* are energized, whereas in searching for a "0," the complement lines 31*b* and 33*b* are energized. The mask 24 selects drive line 33*b* by energizing the proper drive line in the bit strap driver circuitry 13*a* in conjunction with the selection of switch 0. Simultaneously, the drive line 21 is energized by the driver circuit 13*d*.

Since the bits at location 57 and at location 69 are magnetized oppositely, the induced voltages produced by the energizing of the associated drive lines will cancel so that the flag bit 60 will remain magnetized in the clockwise direction. This indicates that the word located along plated wire 9 matches the search criterion 1–0.

On the other hand, the bit at location 56 is magnetized in a counterclockwise direction and the bit at location 68 is likewise magnetized in a counterclockwise direction, and hence, in response to the drive currents on line 33*b* and line 21, a current will be induced in plated wire 8. A current will therefore flow in a direction from terminating network 36 to terminating network 38, both networks being at ground. Current flows in this direction since there is a reduction of flux in the counterclockwise direction when the vector at bit 56 and 68 are rotated from the easy axis of magnetization by the respective drive strap currents. The induced current therefore flows in a direction to oppose this reduction of flux. It will be recalled that line 39 was energized to switch the vector at position 61 if current flowed in line 8, by the technique of bit steering. The induced current has sufficient power to switch the vector at bit position 61 to the counterclockwise direction (i.e., to the "0" direction as indicated by the dotted vector). This switch of the vector at bit position 61 indicates in the flag register 12 that there is a mismatch along plated wire 8 with respect to the required search criterion 1–0. In other words, since the search criterion is 1–0, there is a mismatch along plated wire 8 where a 11 has been stored.

It is the function of the match resolver 14 to determine the address of every location in the memory 10 where a match has been located. This is accomplished in the following way. The resolve lines 43, 45 and 47 are arranged into an address tree. In other words, the bits at locations 62, 63, 64, 65, 66 and 67, located at the intersection of straps 43*a*, 45*a* and 47*a* and the plated wires 8 and 9, are magnetized in a binary count sequence beginning with 0–0–0 to 1–1–1. The resolve straps 14 of FIG. 2 are arranged from 0–0–0 to 1–1–1 for the sake of simplicity but it should be realized that the address tree might readily be arranged in accordance with any number of words required in the memory 10. Thus, in this example, the memory 10 has a word capacity of eight, only two of which are shown. One such word is located along plated wire 8 and has the address 0–0–0, and another is located along plated wire 9, which has the address 1–1–1. The address of the location which has a match will be resolved by the arrangement of FIG. 2 in the following manner:

The resolve command signal conditions the drive circuitry of the flag register 12, the resolve straps 14 and the resolve reference 15. The flag strap 39 and the first resolve strap 43*a* are read out together and the information is transferred to the resolve reference 15. Thus, flag strap 39 is energized simultaneously with strap 43*a* by means of the respective drivers 13*b* and 13*c* in conjunction with the switches E and G. Voltages will be induced in plated wire 9 since the bits at 60 and 63 are magnetized as "1"s. This will cause a current to flow in plated wire 9 which flows from network 38 to 36. Current flows in this direction to oppose the reduction of flux in the clockwise direction around the easy axis as a result of the vector rotation produced by the drive currents in lines 39 and 43*a*. As will be explained, by the technique of bit steering, a "1" is recorded in bit location 69. Since bit location 69 has a "0" recorded therein, the "0 " will be switched to a "1" in the following manner. The drive line 21 is energized by the driver 13*d* just prior to the time that lines 39 and 43*a* are energized so that it is conditioned for bit current steering. That is the vector at position 69 is moved partially to the left and the current induced by the readout which will flow from right to left adds a vector which is directed upward to the partially rotated vector at location 69 and hence the vector at position 69 will be switched to the "1" direction. A current is induced in plated wire 8 since the bit locations 61 and 62 are both magnetized as 0's. The vector at location 68 therefore remains magnetized as a "0" since the induced current merely rerecords at "0" in location 68.

Figure 4:
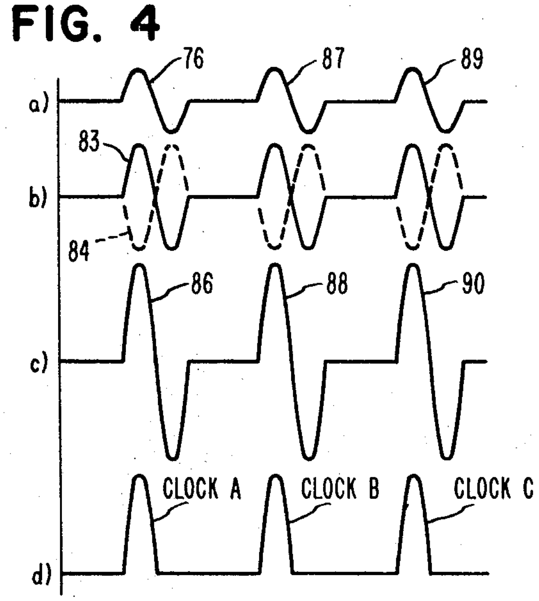
FIG. 4 depicts the signals derived during the sensing operation of the arrangement of FIG. 2.

With reference to FIGS. 2 and 4, drive lines 19 and 21 are then simultaneously energized to read out the information stored in bit locations 59 and 69, respectively. Since the information stored at locations 59 and 69 are both "1"s, a pulse voltage 76 such as the one shown in FIG. 4(*a*) is induced in plated wire 9, and therefore a current flows in plated wire 9. No signal is induced in plated wire 8 since the information vectors at locations 58 and 68 are magnetized oppositely. The pulse 76 approximates a sine wave when the drive pulse (not shown) applied to the respective drive lines is of short duration.

The induced bipolar voltage pulse 76 is utilized in conjunction with the sense line 16. The sense line 16 comprises two drive straps 16*a* and 16*b* which are common connected at point 85. A DC voltage 49 is applied to straps 16*a* and 16*b* as well as to the common connected point 85, which is grounded. This causes a current to flow in straps 16*a* and 16*b* to ground thereby rotating the magnetization vectors to an angle of approximately 45° degrees from the easy axis of magnetization. In the embodiment shown the bit positions 74 and 116 are magnetized as a "1" and the bit positions 75 and 115 are magnetized as a "0." These vectors are shown in greater detail in FIG. 3. Thus, the "1" vector at location 74 is represented by the vector M and the "0" vector at location 75 is represented by the vector N in FIG. 3. These vectors are quiescently oriented in response to the DC bias 49 at about 45° degree position. The bipolar signal 76 shown in FIG. 4(*a*) induced in plated wire 9 causes the vectors N and M to oscillate about the 45° quiescent position so that the differential signal 86 shown in FIG. 4(*c*) is induced across the terminals 80, 81 of the sense line 16.

The induced signal 86 is developed across terminals 80 and 81 in the following manner. During the positive going portion of the pulse current corresponding to waveform 76, the vector M (at location 74) rotates to the position 1 and the vector N (at location 75) rotates to the position 2 from their respective 45° quiescent positions. This rotation of the respective vectors M and N induces respective voltages in lines 16*a* and 16*b*. Thus, the input terminal 80 of the amplifier 18 goes negative with respect to the ground terminal 85. The reason for this results from the fact that a current will be induced in line 16*b* which opposes the reduction of flux in the vertical direction in FIG. 4 (i.e., when the vector M returns to the easy axis direction). This negative going signal is shown as the signal 84 of FIG. 4(*b*).

It can be similarly shown that the terminal 81 of the amplifier 18 is positive going during the positive going portion of the induced signal 76. This results from the fact that when vector N rotates to the position 2 in FIG. 3, there is an increase of flux in the vertical direction in FIG. 3 and the current induced in drive strap 16*a* will oppose this increase in the vertical direction. The current that produces this result will flow from ground terminal 85 to input terminal 81. The induced signal is shown as signal 83 in FIG. 4(*b*). During the negative going portion of the bipolar pulse 76, the vector M at location 74 rotates to the position 3 (FIG. 3) and vector N at location 75 rotates to the position 4. A current is induced in strap 16*b* to oppose the increase of flux in the vertical direction and this current flows from terminal 85 to input 80. Therefore terminal 80 begins to be positive with respect to ground and is shown as signal 84 in FIG. 4*b*. In like manner, the vector N at location 75 rotates to the position 4 by negative going signal 76 and hence the current flows in strap 16*a* to oppose the decrease of flux in the vertical direction. This current causes terminal 81 to go negative and is shown by signal 83. The total differential input voltage across terminals 80 and 81 has a waveform shown as signal 86 in FIG. 4(*c*). Signal 86 is twice the magnitude of signals 83 and 84 taken singly.

The signal 86 is amplified by amplifier 18 and is applied as an input signal to each of AND gates 20*a*, 20*b*, and 20*c* of the gate circuitry 20. The AND gates have respective clock pulses applied thereto. The clock pulses A, B and C are arranged in such a manner that clock A is present at a period of time in coincidence with the positive portion of the signal 86 shown in FIG. 4(*d*). The AND gate 20*a* will therefore gate a signal to the set input terminal of flip-flop 22*a* of the address register 22. Flip-flop 22*a* will therefore be set so that it indicates that the most significant digit of the address has been resolved and is a "one."

The second bit of the address is resolved in the following manner. Drive lines 45*a* and 21 are simultaneously energized by the respective drivers 13*c* and 13*d*. It will be recalled that the information at the bit position 69 has been switched to a "1" and hence, the simultaneous readout of the two signals will not cancel. A current will be produced by these two signals which will cause current to flow from terminating network 38 to network 36. Before the readout of these two signals, drive line 23 is appropriately energized by the driver 13*d* so that the bit position 71 is prepared to have information recorded therein by the technique of bit steering. The current flowing therefore will generate a magnetizing force which will cause the "0" at the bit position 71 to be switched from a "0" to a "1."

The information in bit locations 71 and 59 are then readout by simultaneously energizing straps 19 and 23 via the respective drivers 13*d* and 13*e*. Since both information bits are magnetized as "1"s, the bipolar signal 87 (FIG. 4*a*) will be generated. The signal 87 will produce the signal 88 (FIG. 4*c*) across terminals 80 and 81 of amplifier 18. This is accomplished in the manner just described by utilizing signal 87 as a driving signal to achieve the differential readout of bits 74 and 75.

After amplification by amplifier 18, the signal 88 appears as one of the input signals to each of the AND gates 20*a*, 20*b*, and 20*c*. However, the clock signal B only appears in time with signal 88 so that an output signal is present at the AND gate 20*b*. The output signal of AND gate 22*b* is received at the set input terminal of the flip-flop 22*b* causing the latter to be set. The setting of the flip-flop 22*b* indicates that the second significant digit of the address has also been resolved into a "one."

In order to resolve the least significant digit of the address, the information at bits 67 and 71 are read together. This is accomplished by energizing straps 47*a* and 23 via the respective drivers 13*c* and 13*d* after strap 25 is energized. Since the information at bit locations 67 and 71 are both magnetized as "1"s, a voltage will be induced in the plated wire 9 which will cause a current to flow from terminating network 38 to network 36. This current provides the steering current to record information in the bit position 73. Hence, the current induced in plated wire 9 causes the "0" at bit position 73 to be switched to a "1."

The information at the bit locations 73 and 59 are simultaneously readout by energizing the strap 19 and 25. Since both are magnetized as "1"s, a bipolar voltage 89 (FIG. 4*a*) is induced in the plated wire 9. The signal 89 causes the signal 90 (FIG. 4*c*) to be induced across terminals 80 and 81 of the amplifier 18 via the sense line 16, as above described. This signal will appear at the input of AND gates 20*a*, 20*b* and 20*c*. However, since the clock C only occurs at the time of signal 90, only an output signal will be produced by gate 20*c* which in turn sets flip-flop 22*c*. The setting of flip-flop 22*c* indicates a "one" so that the final address of the match along plated wire 9 is determined as 1-1-1.

The operation of the circuit arrangement of FIG. 2 will be briefly discussed for the mismatch condition along plated wire 8 since the operation is substantially the same as that just discussed. The following operation, it should be understood, will be performed by the circuitry of FIG. 2 at the same time as the match resolve along plated wire 9 is being executed. It will be recalled that the bit position 61 of the temporary flag register was switched to a "0" since a mismatch was obtained along plated wire 8. The information at bits 61 and 62 are then read together with the energization at strap 21. Since they are both "0"s, the "0" bit will be transferred to the bit position 68. The bit position 68 already has a "0" stored therein so the "0" will be rerecorded.

The information at the bit positions 68 and 58 are readout together, but since the information is magnetized oppositely, no signal will be present along plated wire 8 so that the vectors M and N will not oscillate about their 45° quiescent point and no signal will be induced in sense line 16 to effect the resolve operation of the most significant digit of the address along plated wire 9.

The information at the bit locations 64 and 68 are then readout together and transferred to bit location 70. Since locations 64 and 68 are magnetized as "0"s, location 70 will remain the same. Location 70 will have a "0" rerecorded therein. The information at locations 70 and 58 are readout together, but because they are magnetized oppositely, no signal will be induced along plated wire 8 and the vectors M and N will not oscillate about the quiescent point. Therefore, no signal will be induced in sense line 16 to interfere with the resolve operation of the next significant digit of the address.

The information at locations 66 and 70 are readout together and the result transferred to bit location 72. The bit location 72 will have a "0" rerecorded therein since locations 66 and 70 store "0"s, no signal will be present in plated wire 8 by the simultaneous readout of bits 58 and 72 since they are magnetized oppositely, and therefore, the vectors M and N will not oscillate about their quiescent bias positions. Therefore, no extraneous signal will be induced in sense line 16 during the resolve of the least significant digit along plated wire 9.

It is therefore apparent that as the match resolver is determining the address of a location which has a match, the remaining locations which have a mismatch will not interfere with the match resolver process.

The instant invention is so designed that it resolves the most significant address first and then each successive lesser significant address. It should be understood that the logic of the system provided by this invention will only examine the flag locations which indicate a match. The procedure for the resolve operation can be summarized in the following manner when one, two or more matches are obtained.

1. After a search cycle has been completed, transfer the information stored along strap 39 of the flag register 12 and the information along strap 43*a* to the position under strap 21.

2. Energize straps 21 and 19 together and transfer the information thereunder to the sense amplifier 18 via the sense line 16. If the output is a 1, the flip-flop 22*a* of the address register 22 is set and proceed to step (3). If the output is a 0, the flip-flop 22*a* is not set and the system proceeds to step 8.

3. Read straps 45*a* and 21 together and transfer the information to strap 23.

4. Read strap 23 and strap 19 together and transfer the information to the external sense amplifier 18 via the sense line 16. If the output is a "1," the flip-flop 22*b* of the address register 22 is set and proceed to step (5). If the output is a "0," the flip-flop 22*b* is not set indicating the middle digit of the address is a "0" and the system proceeds to step (7).

5. Read straps 23 and 47*a* together and transfer the information to strap 25.

6. Read straps 25 and 19 together and transfer the information to the sense amplifier 18 via the sense line 16. If the output is a "1," the flip-flop 22*c* of the address register 22 is set and the flag bit at location 60 is reset using the information along straps 25 and 19 (i.e., the information at locations 59 and 73) and return to step (1). If the output is a "0," the flip-flop 22*c* is not set and the flag bit is reset using the information along straps 19 and 23 and the system returns to step (1).

7. Read the information under straps 21 and 47*a* together and transfer the information to strap 25. Return and follow step (6), except when the output is "0," reset the flag bit with straps 21 and 19 together and return to step (1).

8. Read straps 39 and 45*a* together and transfer information to strap 23. Return and follow step (4), except when the output is "0," put "0" in flip-flop 22*b* and proceed to step (9).

9. Read straps 39 and 47*a* together and transfer information to strap 25. Return to step (6), except if the output is "0," put "0" in flip-flop 22*c* and reset the flag bit with the strap 19 and 41 and indicate that the resolve operation is completed.

By way of example, when the address 1–1–1 has been resolved in the manner above described, the flag bit at location 60 is reset to "0" in the following manner. During the readout of straps 19 and 25 in order to resolve the last bit of the address, the rotation of the vectors at bit locations 59 and 73 induce a bipolar signal which causes current to flow from terminating network 38 to 36 and then from network 36 to network 38. The fall time of the current pulse applied to strap 39 is made to coincide with the steering current which flows from network 36 to network 38. This causes the vector at the bit position 60 which is magnetized as a "1" to be switched to a "0." This is shown as the dotted vector having a counterclockwise orientation. After the flag is reset, the resolve operation is returned to step 1.

RANDOM ACCESS MODE OF OPERATION

The instant invention also operates in the random access mode as briefly discussed above. In this mode, the information located in a certain address is required for a computer read or write cycle. The address required to be located is inserted in the address register 22 by the central processor (not shown). The address inserted in the address register 22 becomes the search criterion in the same manner that the required information, 1–0, become the search criterion when discussing the associative memory mode above.

Prior to beginning the random access mode, all bit locations of the flag register 12 are reset to the clockwise or "1" orientation. Similarly, all the bit locations of the resolve references 15 are reset to the counterclockwise or "0" orientation.

By way of example, let us assume that the address 0–0–0 is required to be located for a read or write cycle. It will be recalled that the resolve straps 14 in conjunction with the various plated wires are arranged into an address tree for this example, from the address 0–0–0 along plated wire 8 to the address 1–1–1 along plated wire 9. As mentioned above, the addresses 0–0–0 to 1–1–0 have been omitted for simplicity purposes. Accordingly, straps 43*b*, 45*b* and 47*b* are consecutively energized by the drivers 13*c* in conjunction with the reference strap 21. Thus, when straps 43*b* and 21 are simultaneously energized in order to locate the most significant digit of the address 0–0–0, no signal is induced along plated wire 8 since the information at bit 68 and 112 are oppositely magnetized. However, a signal is induced along plated wire 9 since the information at bit locations 86 and 69 are both magnetized in the counterclockwise direction. The magnetization vectors at these positions are rotated in a clockwise direction when current is conducted to ground in straps 43*b*, by the closing of switch H, via driver 13*c* and when current is conducted in strap 21 via driver 13*d*. This vector rotation will cause current to flow from terminating network 36 to 38. Just before straps 43*b* and 21 are simultaneously energized, the flag strap 39 is energized, by driver 13*b*, so that the vectors lying thereunder which are magnetized as "1"s are rotated to an angle less than 90° from the easy axis and are in a condition to be switched. Therefore, the vector at the location 60 is switched to the counterclockwise orientation by the steering current inducted in plated wire 9. It will be recalled that information can be transferred from one location to another location by the technique of bit steering. However, there is no current induced in plated wire 8 so that the vector at location 61 remains oriented in a clockwise or "1" direction.

In like manner, drive lines 45*b* and 21 are simultaneously energized respectively, by closing switch J via the driver 13*c*, and via driver 13*d*. The information located at the bit positions 87 and 69 is magnetized as "0"s thereby inducing a current in plated wire 9 which flows from network 36 to 38. Since the information at the flag location 60 is now magnetized as a "0" by the previous search, the current in plated wire 9 will merely rewrite the same information therein. The information at locations 68 and 113 are oppositely magnetized so that no current is developed in plated wire 8. The magnetic vector at location 61 therefore remains magnetized as a "1."

The last bit of the required address is searched by simultaneously energizing drive lines 47*b* and 21 by respectively closing switch L via driver 13*c* and via driver 13*d*. A current is again induced in plated wire 9 which flows from network 36 to network 38. Since the vector at location 60 is magnetized as a "0," the steering current in plated wire 9 will merely rewrite a "0" therein. Furthermore, no current will be induced in plated wire 8 since the information at locations 114 and 68 is oppositely magnetized and therefore the flag bit 61 will remain magnetized as a "1."

Accordingly, the switching of the vector at location 60 from a "1" to a "0" indicates a mismatch along plated wire 9, whereas the "1" in the flag location indicates that a match has occurred along plated wire 8 and the address 0–0–0 is located thereat.

READ OPERATION DURING RANDOM ACCESS MODE

Figure 3:
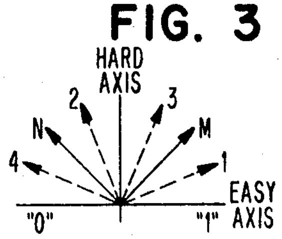
FIG. 3 shows the vector arrangement during a sensing cycle.

In order to read out the information along plated wire 8, respective DC biases 91 and 92, in conjunction with closed switches A, B, C, and D, are applied to the sensing straps 31 and 33. The DC bias 91 causes current to flow through straps 31*a* and 31*b* to ground, thereby rotating the various sectors along its length to an angle of approximately 45° from the easy axis. Similarly, the DC bias 92 causes current to flow in straps 33*a* and 33*b* to ground thereby rotating the vectors to an angle of approximately 45° as shown in FIG. 3.

The flag register 12 is arranged to read out the information stored along the plated wire word line for which a match has been obtained. This is accomplished by simultaneously reading out the information along drive straps 39 and 41 of the flag register. Thus, the simultaneous read out of the information stored along straps 39 and 41 produces no induced signal where a mismatch has occurred and a signal where a match condition exists. This is demonstrated in the following manner. It will be recalled that there was a match detected on line 8 in accordance with our last example, hence locations 61 and 89 both have "1"s while location 60 has a "0" and location 90 has a "1." The read out of the information at locations 60 and 90 produce no signal in plated wire 9 since they are magnetized oppositely, whereas locations 61 and 89 will produce a signal since they are both magnetized in the clockwise direction or as "1"s.

The rotation of vectors 61 and 89 will cause a bipolar pulse to be induced in plated wire 8 similar to that shown in FIG. 4(*a*). The bipolar current flowing in plated wire 8 causes the vectors at locations 51, 55, 52 and 56 to oscillate about the 45° quiescent point (provided by the respective DC bias voltages). Voltages will be induced across the input terminals 96, 97, 98 and 99 of the bit sense amplifiers 94 and 95, respectively, in the manner previously described with respect to sense line 16. Thus, the "1" information bit at position 51 provides an induced signal in the following manner. The bipolar pulse induced in plated wire 8 by the simultaneous read out of bits 61 and 89 causes current to first flow from network 38 to network 36 and then from network 36 to network 38. The reason for the flow in the first mentioned direction is that there is a reduction of flux in the clockwise direction when the vectors are rotated by the strap currents from driver circuits 13*b*. When the vectors return to the easy axis direction after the energizing pulse has been removed, the current in the plated wire changes direction.

The rotation of the vectors at position 51 and position 55 about the 45° quiescent point by current flowing from network 38 to network 36 causes current to flow in strap 36*a* from terminal 96 of amplifier 95 to ground whereas current in strap 31*b* flows from ground to terminal 97. In other words, terminal 97 is positive going and terminal 96 is negative going. The vectors at locations 52 and 56 are similarly rotated and oriented and so produce the same signal across terminals 98 and 99 of the sense amplifier 94. The amplified differential output signals 100 and 101 are shown as respective input signals to the gates 121 and 122. The gates 121 and 122 are similar to the gates 20 previously described. The clock signals A are simultaneously applied to the gates 121 and 122 so that the flip-flops (not shown) comprising the data register 30 may be simultaneously set. This arrangement is unlike that of the address register 20 wherein the respective flip-flops are set in a serial manner. The phase of the output signal indicates whether a "0" or a "1" is stored at the data bit location and determines whether the flip-flop in the data register 30 will be set or remain unset. Since the information bits stored in locations 51 and 52 are both "1"s, the two flips of the data register 30 will be set. Hence, upon the completion of the read cycle, the information read out of the memory and stored in the register 30 is 1-1 in this particular example.

WRITE OPERATION DURING RANDOM ACCESS MODE

Let us assume that it is required to perform a random access write operation. Let us further assume that it is required to perform a write operation in the address 1-1-1 and in particular to write the information "0" in the location 50 and the information "1" in the location 53. Before the write operation is begun, the various vectors of the flag register 12 and the resolve reference 15 are set respectively to the clockwise and the counterclockwise orientation.

The address 1-1-1 is obtained in the manner previously described. Thus, the drive straps **43*a*, 45*a* and 4*a* are consecutively energized in conjunction with the reference strap 21 by the respective driver circuits 13*c* and 13*d*. Simultaneously the logic closes in proper sequence the switches G, I and K. When straps 43*a* and 21 are simultaneously energized, no signal is induced along plated wire 9 since the bit locations 63 and 69 are magnetized oppositely. However, a signal is induced in plated wire 8 since the vectors at location 62 and 68 are both magnetized in the counterclockwise direction. The flag register 12 is prepared to record the results of the address search by energized strap 39 by means of driver 13*b* just prior to the energizing of straps 43*a* and 21 and by closing switch E. The vector at location 60 will remain in the clockwise orientation because no steering current is supplied along plate wire 9. The steering current developed in plated wire 8 flows from terminating network 36 to network 38. This current will cause the vector at location 61** to be switched to a "0" magnetization. The switching of the flag register to a "0" indicates that a mismatch exists along location 0-0-0.

Straps **45*a* and 21 are next energized simultaneously by means of the respective driver circuits 13*c* and 13*d*. No signal is induced along plated wire 9 since the bit locations 65 and 69 are oppositely magnetized. A signal is induced in plated wire 8 since the bit locations 64 and 68 are both magnetized in the counterclockwise direction. This signal causes current to flow from network 36 to network 38. However, since the information at location 61 is magnetized as a "0," the steering current generated will merely rerecord this "0" information. When straps 47*a* and 21 are simultaneously magnetized, no signal is induced along plated wire 9 since the bits at locations 67 and 69 are opposite but is induced in plated wire 8 since bits 66 and 68 are both magnetized as "0"s. In a similar manner as described above, a "0" is rerecorded in location 61. A match is therefore indicated in the flag register 12 by the "1" magnetization at location 60 and a mismatch is indicated by the "0" magnetization at location 61** and the flag bits corresponding to all other addresses (except address 1-1-1 in this example).

Figure 5:
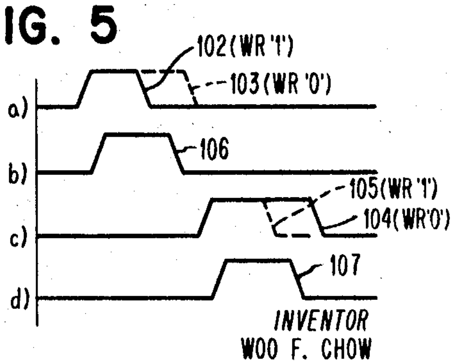
FIG. 5 shows the signal arrangement for accomplishing a write cycle for the arrangement of FIG. 2.

To perform the write cycle so that a "0" is written in location 50 and "1" is written in location 53, the individual straps **31*a*, 31*b*, 33*a* and 33*b* are selectively energized and the steering currents are supplied by the readout of the flag register 12. Thus, for example, data strap 33*a* is energized by the pulse 102 (FIG. 5*a*) and complementary strap 33*b* is energized by the signal 103 (FIG. 5*a*). Both of these signals are initially conditioned by the mask 24 in conjunction with the driver circuit 13*a*. These respective signals (signals 102 and 103) cause current to flow through strap 33*a* to ground and through strap 33*b* to ground. The currents developed cause the magnetization vectors to rotate toward the hard axis of magnetization to an angle less than 90° from the easy axis of magnetization. It should be noted that the drive pulses 102 and 103** have a different pulse duration, the reason for which it will become apparent hereinafter.

The flag register 12 is then read out by simultaneously energizing straps 39 and 41 via driver **13*b* and simultaneously closing switches E and F. The drive pulse 106, in FIG. 5*b* is applied simultaneously to straps 39 and 41 so that current flows in each strap to ground thereby rotating the magnetization vectors at locations 60 and 90** to an angle less than 90°.

In response to rotating the vectors at locations 60 and 90 current will flow first in a direction from terminating network 38 to network 36 due to the rise time portion of pulse 106 which is made to be slightly ahead of the fall time of pulse 102. The steering current which is developed during the rise time of pulse 106 causes the vector at position 53 to be switched to a "1." The bit at location 57 is switched to a "0" by the fall characteristic of the steering pulse 106 applied slightly ahead of the fall time of pulse 103. In other words, the fall time of the steering pulse 106 causes current to flow from network 36 to network 38. Hence, the data location 50 has a "0" recorded therein.

The writing of a "0" in the locations 53 occurs as follows. The drive straps **31*a* and 31*b* are selectively energized by the pulses 104 and 105 as shown in FIG. 5*c*. Straps 39 and 41 of the flag register 12 are simultaneously energized by the signal 107 through the closing of switches E and F via the driver circuit 13*b*. It should be noted that the drive pulse 104 applied to the drive strap 31*a* to write a "0" is of different duration than the pulse 105 applied to strap 31*b*** to write a "1."

The difference in pulse width is required for a similar reason given to the difference of pulse width of 102 and 103.

Therefore, the fall time of the signal 105 corresponds to a time slightly behind the rise time of the steering current 107. The rise time of the steering current 107 causes current to flow in plated wire 9 from network 38 to 36 so that the vector at location 54 is switched to a "1." Slightly ahead of the fall time of the signal 104, the steering current changes directions and flows from network 36 to network 38. This change of steering current direction results from the fall time of the signal 107 and a "0" is written into location 50. Hence, the data 0-1 and their complement have been written into two memory locations of address 1-1-1 of the memory 10 in this example.

Figure 6:
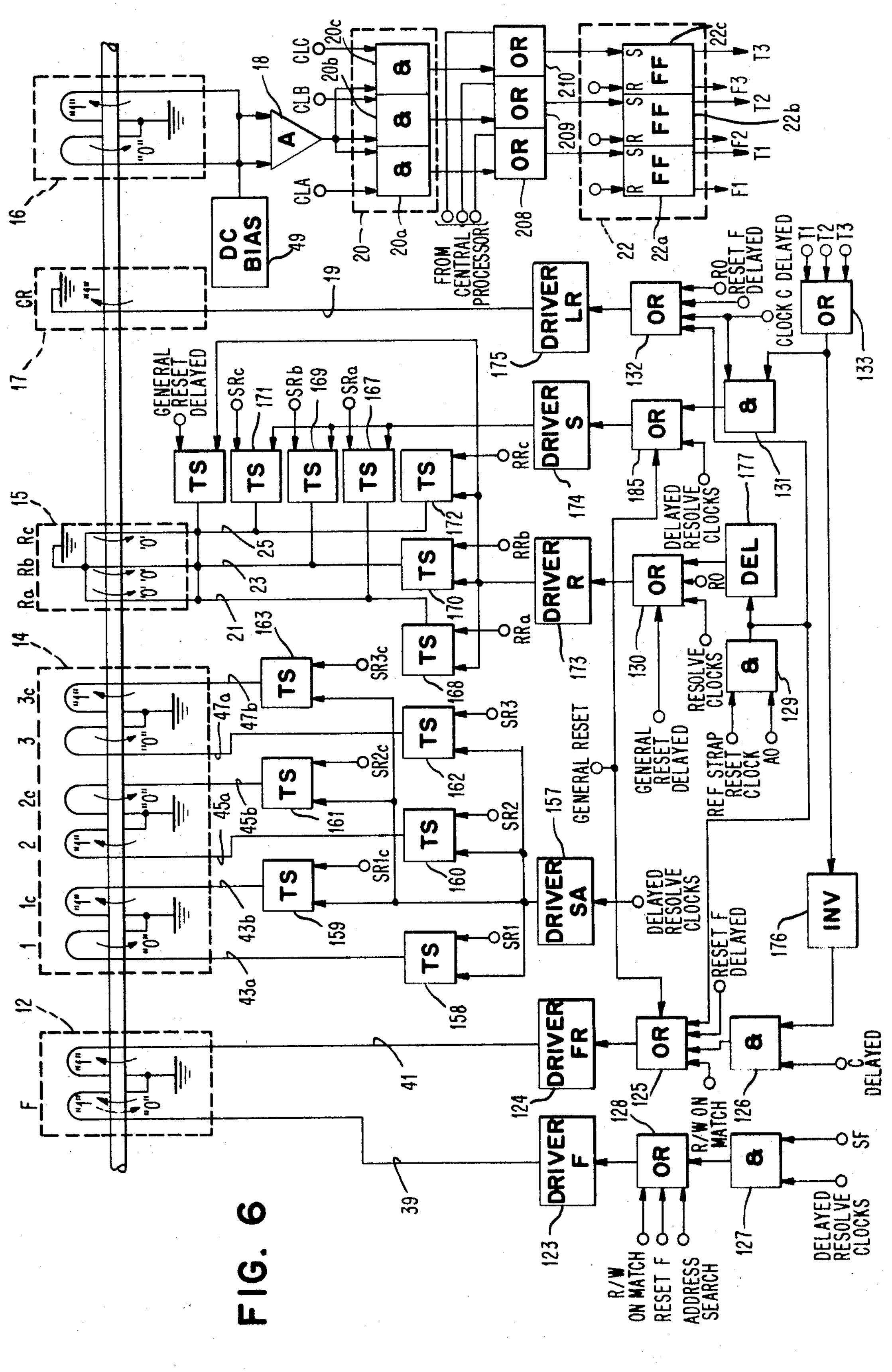
FIGS. 6, 7 and 8 depict the logical diagram for the instant invention.
Figure 7:
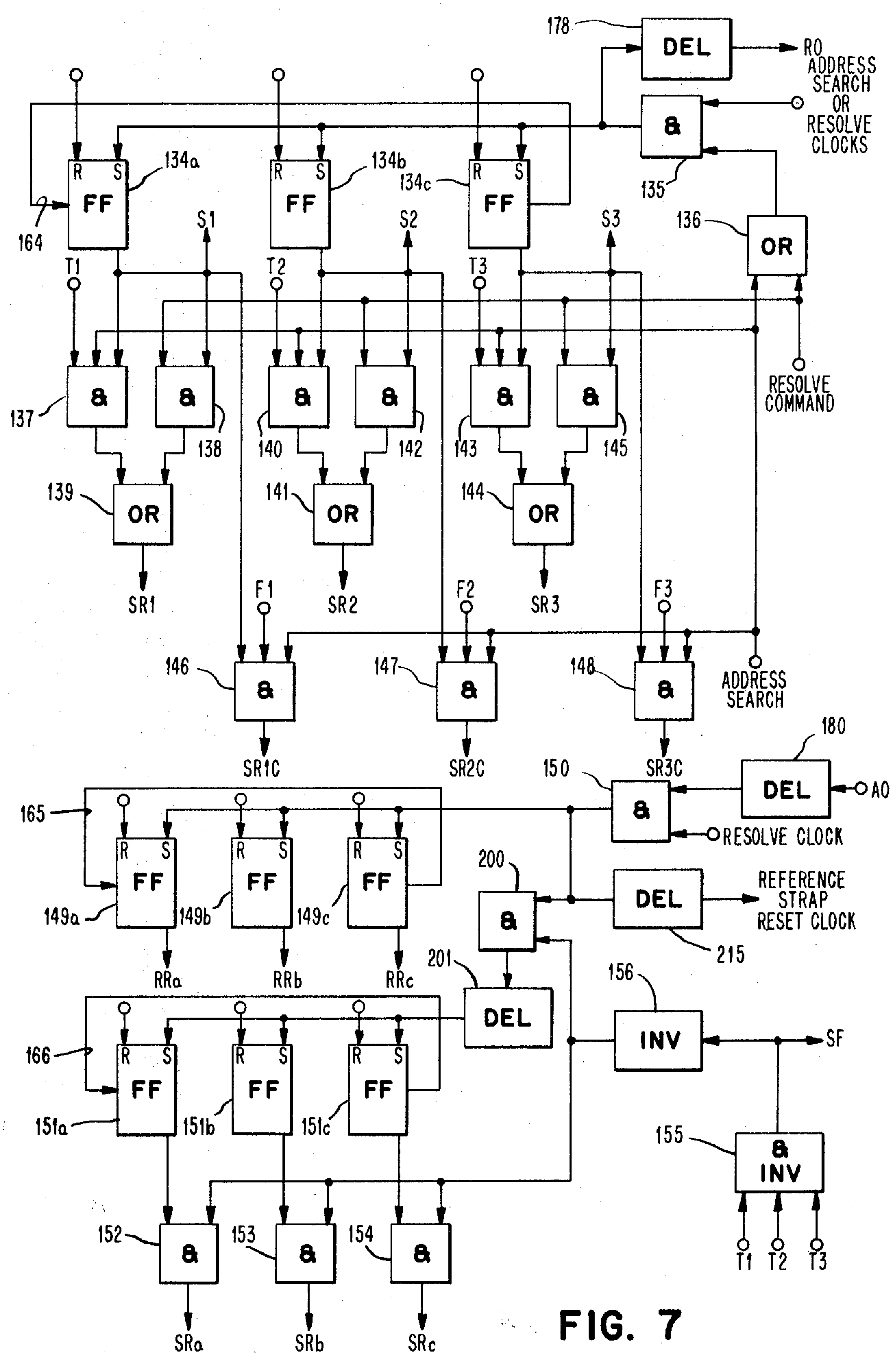
Figure 8:
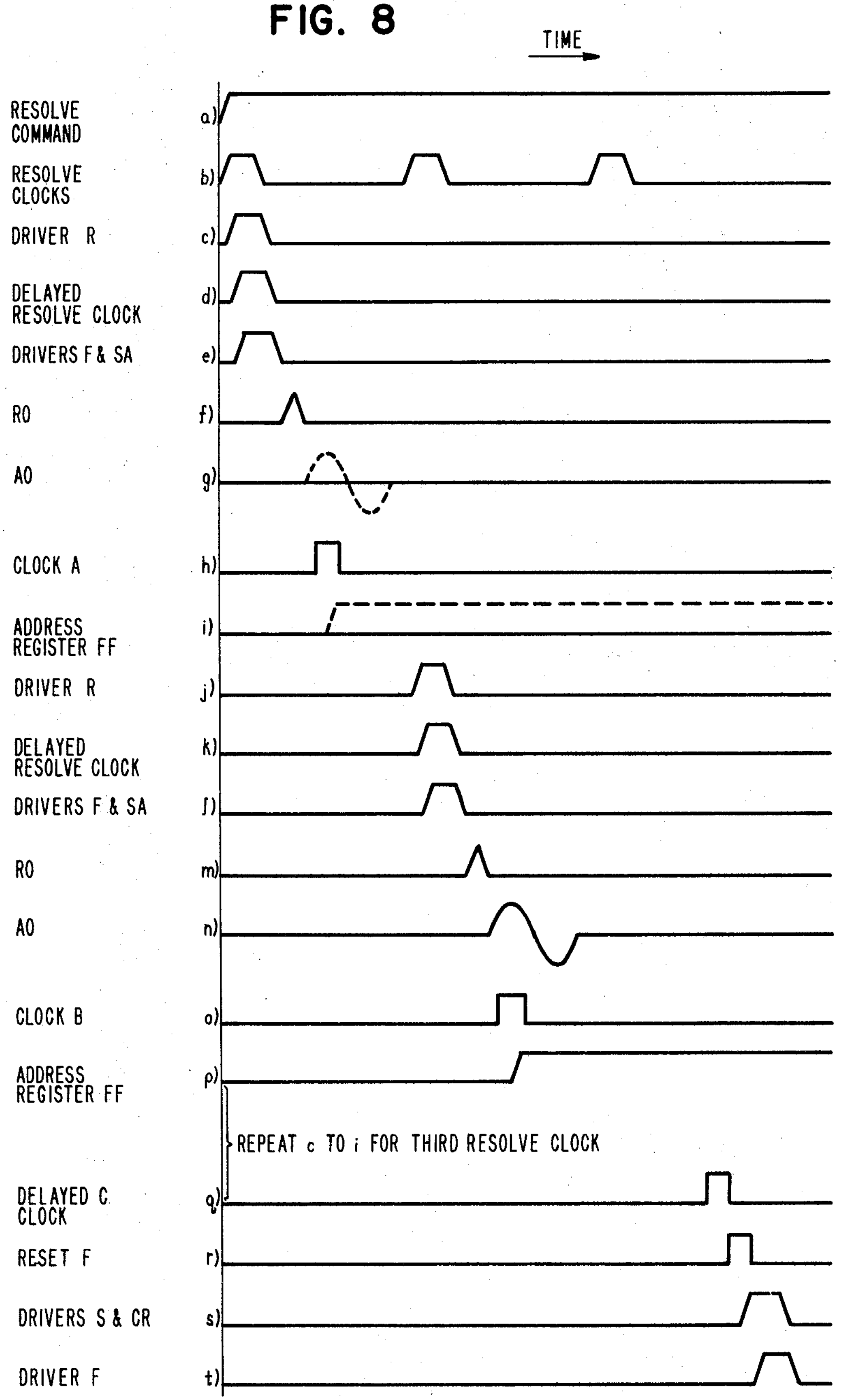

Referring now to FIGS. 6, 7 and 8 there is depicted the logical circuitry required to perform the resolve operation when the computer is operated in the associative memory mode as well as that required for the addressed search when operating in the random access mode. A comparison of FIG. 2 and FIG. 6 shows that switches G, H, I, J, K and L of FIG. 2 are now implemented by transistor switches (TS)158 to 163 in FIG. 6. Switches E and F of FIG. 2 are included in the drivers 123 and 124 of FIG. 6. The resolve reference straps 21, 23 and 25, and the memory reference strap 17 shown in FIG. 6 are the corresponding straps shown in FIG. 2. The logical operation will be discussed with the resolve operation firstly. Let us assume that the flag register 12 in FIG. 6 has recorded a match along a certain plated wire. It will be recalled that in the discussion of FIG. 2, the operation of the match resolver was discussed for a match along plated wire 9 and the address resolved was 1-1-1. For the sake of discussion, let us assume that the plated wire of FIG. 6 has a match located along its length and its address is 0-1-. The address 0-1-0 is obtained in the following manner.

It will be recalled that the intersections of the drive straps 39 and 41 with the plated wire of the flag register 12 are both magnetized as "1"s (i.e., in the clockwise direction) when a match has been obtained after an information search. In order to resolve the 0 bit of the address 0–1–0, drive line 39 and 43*a* are simultaneously energized and the information is transferred along the plated wire to the position under drive strap 21 of the resolve reference 15. Drive lines 39 and 43*a* are logically energized in the following manner. Referring momentarily to FIG. 7, the signal SF is generated as the output of the NAND gate 155. Thus, when flip-flops 22*a*, 22*b* and 22*c* (of the address register 22) are reset at the beginning of the resolve operation, the outputs T1, T2 and T3 are all low. Therefore, the output SF is high when T1, T2 and T3 are all applied to the NAND gate 155 (FIG. 7).

The AND gate 127 (FIG. 6) is therefore conditioned by the signals SF and a delayed resolve clock signal. The resolve clock signal is generated by clock generators (not shown). The delayed resolve clock signal is depicted in FIG. 8*d*. The conditioning of the AND gate 127 provides a positive pulse which is applied to the OR gate 128. The positive signal applied to the OR gate 128 conditions the latter so as to energize the driver F123. The energizing of the driver F123 causes current to flow in the drive strap 39 in an upward direction to ground. The output of the driver F123 is shown in FIG. 8*e*.

Simultaneously with the energizing of drive strap 39, the drive strap 43*a* is energized. This is logically accomplished by the following way. The driver SA157 (FIG. 6) is energized by the delayed resolve clock (FIG. 8*d*). The driver SA157 therefore produces an output signal (FIG. 8*e*) which is applied to the transistor switch (TS)158. A second signal is applied to the TS circuit 158 consisting of the signal SR1. Signal SR1 is generated by the logical circuitry shown in FIG. 7.

Signal SR1 is generated as follows: The resolve command signal (FIG. 8(*a*) is applied to the OR gate 136 (FIG. 7) so that the latter is conditioned. The conditioning of the OR gate 136 causes a positive pulse to be generated which is applied as one of the two inputs to the AND gate 135. The second input applied to the AND gate 135 is the resolve clock pulse shown in FIG. 8*b*. When these two signals are present the AND gate 135 is conditioned thereby setting flip-flop 134*a* of the ring counter 164. It should be noted that the ring counter 164 has been reset at the beginning of the resolve operation to the 0–0–state. Accordingly, the AND gate 138 is conditioned by the signal S1 from the flip-flop 134*a* and the resolve command signal. The output signal of the AND gate 138 is applied to the OR gate 139. The conditioning of the OR gate 139 results in the signal SR1. With the application of the signal SR1 together with the output of the driver SA157 to the circuit TS158, current is made to flow in the drive strap 43*a* to ground.

The information stored along plated wires 39 and 43*a* are transferred to the strap 21. This is accomplished by the technique of bit steering previously described. To transfer the information to the plated wire under drive strap 21, the latter is prepared or conditioned before the readout of the straps 39 and 43*a*. In other words, the magnetization vectors at the intersection of the strap 21 and the plated wire are rotated to an angle less than 90° from the easy axis of magnetization. This conditions the magnetization vector to be switched into a "0" or a "1" by the bit steering current that is generated by the simultaneous readout of straps 39 and 43*a*. Drive strap 21 logically is prepared to accomplish bit steering in the following manner.

The OR gate 130 (FIG. 6) is conditioned by the resolve clock signal shown in FIG. 8*b*. It should be noted that the energizing of the strap 21 is initiated by the resolve clock whereas the energizing of drive straps 39 and 43*a* is initiated by the delayed resolve clock signal. This means that the strap 21 is energized slightly before the energizing of straps 39 and 43*a* so that the bit steering technique may be accomplished. The output of the OR gate 130 causes the driver R173 to be energized. This signal is one of two which is applied to the transistor switch 168.

A second signal, $RR_a$ is required to be applied to the transistor switch 168 in order to make it conductive. The signal $RR_a$ emanates from the first stage flip-flop 149*a* of the ring counter 165 (FIG. 7). The signal $RR_a$ emanating from the flip-flop 149*a* is produced when the ring counter 165 has been in the initial state and is prepared to be stepped. When the transistor switch 168 is energized, it causes current to flow through the strap 21 to ground. Hence, the "0" vector is rotated away from the easy axis at an angle less than 90°. This vector is therefore in a condition to be steered by a steering current generated in the plated wire. However, when drive straps 39 and 43*a* are simultaneously energized no bit steering current is generated since the plated wire along strap 39 is magnetized as a "1" and the plated wire along strap 43*a* is magnetized as "0." Hence, the two signals cancel and no bit steering current is generated. Therefore, the plated wire along strap 21 is remagnetized as a "0," when the strap current in 21 is removed.

The information along straps 21 and 19 are next read together and the information is transferred to the sense amplifier 18 via the sense line 16 in the following manner. The readout pulse RO (FIG. 8*f*) is generated by the output pulse of the AND 135 (FIG. 7) which is delayed by the delay line 178. The delay line 178 is of sufficient time delay duration to allow the read out of the information along straps 39 and 43*a* and transfer it along the plated wire to the position under strap 21. The read out pulse RO is simultaneously applied to the OR gates 130 and 132 (FIG. 6), respectively. The output of the OR gate 130 is applied to the driver R173 and the output of the OR gate 132 is applied to the driver CR175. The output of the driver R173 is applied to the transistor switch 168. A second signal $RR_a$ is produced by the ring counter 165 (FIG. 7) as previously discussed. Flip-flop 149*a* of the ring counter 165 continues to produce the signal $RR_a$ during this cycle of operation since it has not been stepped from the previous cycle. The energizing of the transistor switch 168 by the two above described signals causes the drive line 21 to conduct current to ground. Simultaneously, the energizing of the driver CR175 causes current to be conducted in drive line 19 to ground. No current is generated in the plated wire since a "0" is stored along strap 21 and a "1" is stored along strap 19.

The resolve command signal shown in FIG. 8*a* is applied to the DC bias 49 (FIG. 6). Since no drive current is generated in the plated wire by the simultaneous readout of straps 19 and 21, no signal is induced across the input terminals of the amplifier 18. Therefore, no signal would appear in FIG. 8(*g*) under the conditions just described. The dashed line shows where such an output would have occurred if there had been one. The output of the amplifier 18 would have been applied to the AND gate 20*a* together with the clock pulse A shown in FIG. 8(*h*). It is apparent, however, that the AND gate 20*a* is not conditioned and therefore does not generate a set pulse for the flip-flop 22*a*. Hence, the flip-flop 22*a* produces a F1 signal indicating that the least significant number of the address is 0.

In order to resolve the second digit of the address 0–1–0, drive lines 39 and 45*a* are simultaneously energized and the information is transferred to the strap 21. It should be noted that in the description of the operation of FIG. 2, it was stated that in the resolving of the second bit information was transferred to the strap 23. However, the logical implementation of FIG. 6 and 7 permit the information to be transferred to strap 21 since in the last resolve step, the information along strap 21 remained magnetized as a "0." Accordingly, the AND gate 127 (FIG. 6) is permissed by the second delayed resolve clock (FIG. 8*k*) together with the signal SF. The signal SF is generated by the output of the NAND gate 155 (FIG. 7). The NAND gate 155 is permissed by the three input signals T1, T2 and T3 which are all still low since flip-flop 22*a* remains reset after the first "0" bit is resolved. The output signal of the AND gate 127 (FIG. 6) permisses the OR gate 128. The output of the OR gate 128 energizes the driver F123. The output of the driver 123 causes current to flow through the flag strap 39 to ground.

Drive strap 45a is energized in the following manner. The second delayed resolve clock (FIG. 8k) energizes the driver SA157. The output of the driver SA157 is applied as one of the inputs to the transistor switch 160. A second input to the transistor switch 160 is the signal SR2. The signal SR2 is generated by the ring counter 164 (FIG. 7). Thus, the resolve command signal conditions the OR gate 136, which is applied to the AND gate 135. The second signal applied to the AND gate 135 is the second resolve clock (8b). When both signals are present the AND gate 135 is conditioned. This causes the ring counter 164 to be stepped so that the first flip-flop 134a is reset and the flip-flop 134b is set. The setting of the flip-flop 134b produces the output signal S2. The signal S2 is applied to the AND gate 142. The resolve command signal (FIG. 8a) is also applied to the AND gate 142. Hence, a signal will be provided by the AND gate 142 which is applied to the OR gate 141 thereby conditioning the latter. The OR gate 141 thereby produces the signal SR2.

The application of the signal SR2 and the output of the driver SA157 (FIG. 6) causes the TS160 to be energized thereby causing current to flow through the driver strap 45a to ground.

Prior to the energizing of straps 39 and 45a, the strap 21 is energized so as to prepare the information along the plated wire in the event that the steering current is induced therein. Thus, the resolve clock applied to the OR gate 130 gates a signal therethrough which is applied to the driver R173. The output of the driver R173 is applied to the transistor switch 168. A second signal is applied to the transistor switch 168 which is identified by the signal $RR_a$. The signal $RR_a$ is generated by the ring counter 165 (FIG. 7) which has not been stepped from the previous cycle since no output signal AO was produced.

Since a "1" is stored along the plated wire at the drive strap 39 and a "1" is located along the plated wire at the drive strap 45a, a current is induced in the plated wire in response to these positions being energized as described above. This current initially flows from right to left in the plated wire in accordance with Lenz's Law. This current is called a bit steering and causes the "0" vector of the plated wire under the strap 21 to be switched from a "0" to a "1."

The information under straps 21 and 19 are then simultaneously read out. This is logically accomplished in the following manner. A read out signal RO (FIG. 8m) is applied to the OR gate 132 (FIG. 6) after the second resolve clock signal. The output of the OR gate 132 is applied to the driver CR175. The energizing of the driver CR175 causes a current to be conducted in strap 19 to ground. In like manner, a read out signal RO is applied to the OR gate 130. The output of the OR gate is applied to the driver R173. The energizing of the driver R173 is applied to the transistor switch TS168. Simultaneously a signal $RR_a$ emanates from the flip-flop 149a of the ring counter 165 (FIG. 7). Signal $RR_a$ is the output of the ring counter 165 in its initial state. When both signals are applied to the transistor switch TS168, a current is produced in the drive line 21 to ground. Hence, straps 21 and 19 are simultaneously energized.

Since the information along straps 19 and 21 are magnetized as "1"s, a pulse will be induced in the plated wire. This pulse approximates a sine wave, if the drive pulse applied to the respective drive straps are of short duration. Furthermore, the resolve command signal is applied to the DC bias 49 of the sense strap 16. A DC bias 49 causes the "0" and "1" vectors juxtaposed to the respective straps of the sense line 16 to be rotated to an angle of approximately 45°. Hence, the bipolar approximate sine wave signal which is generated along the plated wire causes the "0" and "1" vectors to oscillate about the 45° position. A differential output is obtained across the input terminals of the amplifier 18. The amplified output of the amplifier 18 is shown in FIG. 8n as a solid curve. This signal is applied to each of the AND gates 20a, 20b and 20c. However, the AND gate 20b is the only gate permissed since the clock pulse *b* (FIG. 8(*o*)) is simultaneously applied at this time. Hence, the flip-flop 22b is set which causes the output T2 to go high and the output F2 to go low (FIG. 8(*p*).

The signal AO produced by the amplifier 18 is also applied to the delay line 180 (FIG. 7). This signal is delayed so as to be in time relationship to the next (the third) resolve clock (FIG. 8b) and when these two signals are present the AND gate 150 is conditioned. The output of the AND gate 150 steps the ring counter 165 to the next state. Therefore, the flip-flop 149a is reset and the flip-flop 149b is set thereby producing an output signal $RR_b$. Similarly, ring counter 166 is stepped by the conditioning of the AND gate 200. Thus, one input to the AND gate 200 is the output of the conditioned AND gate 150 whose operation was just discussed. The second input to the AND gate 200 results from the following operation. The NAND gate 155 remains low since T2 is high after the setting of flip-flop 22b whereas the inputs T1 and T3 remain low. The low input becomes high at the output of the inverter 156. Hence, AND gate 200 is conditioned thereby resetting flip-flop 151 a and setting flip-flop 151b.

In order to resolve the last digit of the address 0–1–0, straps 47a and 21 are simultaneously energized and the information is transferred to strap 23. It should be noted that the logical implementation is slightly different from the operation described in FIG. 2. Thus, the implementation of FIG. 2 calls for reading straps 47a and 23 together and transferring the information to strap 25. However, it will be recalled that the logical implementation utilized strap 21 twice in resolving the first two bits of the address 0–1–0 since a "0" was located along strap 21 after the resolution of the first digit. Hence, the information along strap 21 was used twice. Before straps 47a and 21 are energized, strap 23 is energized so that the plated wire is in a condition to be switched by the technique of bit steering. Strap 23 is energized in the following manner. The signal $RR_b$ which emanates from the flip-flop 149b of the ring counter 165 (FIG. 7) is applied to the transistor switch 170. The driver R173 is simultaneously energized by the output of the OR gate 130 which has been conditioned by the next (the third one) resolve clock (FIG. 8b). Therefore, the transistor switch 170 is energized thereby causing current to flow through the strap line 23 to ground. The energizing of the strap 23 causes the "0" vector to be rotated to an angle less than 90° from the easy axis.

Shortly after the energizing of strap 23, straps 21 and 47a are simultaneously energized. Strap 21 is energized in the following manner. The transistor switch 167 becomes conductive when the two signals SR*a* and the output of the driver S174 are present. The signal SR*a* is produced by the ring counter 166. It will be recalled that after resolving of the second bit of the address 0–1–0 the ring counters 165 and 166 were stepped. However, ring counter 166 is stepped after a delay, due to delay element 201, in order to provide signal SR*a* for the simultaneous readout of straps 21 and 47a.

Strap 47a is energized by the transistor switch 162. The transistor switch 162 is energized by the signal SR3 and the output of driver SA157. The signal SR3 is generated by the output of the ring counter 164. The signal SR3 is produced when the flip-flop 134c (FIG. 7) is set. The flip-flop 134c is set when the OR gate 136 is conditioned by the resolve command signal (FIG. 8a). The output of the OR gate 136 in conjunction with the third consecutive resolve clock conditions the AND gate 135 so that the ring counter 164 is stepped and the flip-flop 134c is set. The AND gate 145 is conditioned by the signal S3 in conjunction with the resolve command signal (FIG. 8a). The output of the AND gate 145 is applied to the OR gate 144 thereby producing the signal SR3. The second signal applied to the switch TS162 emanates from the driver SA157. The driver SA157 becomes energized by the delayed resolve clock (similar to those shown in FIG. 8d or 8k but in the third clock period).

When straps 21 and 47a are simultaneously energized, current is conducted to the respective straps to ground. Since plated wire along strap 21 is magnetized as a "1" and the plated wire along strap 47a is magnetized as a "0," no voltage will be induced in the wire since the signals cancel. Since no steering current is generated in the plated wire, the information along the plated wire under strap 23 remains magnetized as a "0."

Straps 23 and 19 are thereafter simultaneously energized and the information is transferred to the flip-flop 22*c* of the address register. This is accomplished by generating the readout signal RO which is obtained at the output of the delay line 178 (FIG. 6). Signal RO is applied to the OR gate 132 so that the latter is conditioned. The output of the OR gate 132 is applied to the driver CR175 which causes current to be conducted in the drive strap 19 to ground. Strap 23 is energized by means of the transistor switch 170. The transistor switch 170 is energized by means of driver R173 which is in turn energized by the conditioning of the OR gate 130. The OR gate 130 is permissed by means of the RO signal. The second signal $RR_b$ is also applied to the transistor switch 170. The signal $RR_b$ is produced by the ring counter 165.

The simultaneous energizing of straps 19 and 23 induces no current in the plated wire since the information along straps 19 and 23 are oppositely magnetized. Accordingly, no readout driving current is developed which reads out the information along the sense winding 16. Therefore, no input signal is applied across the input terminals of amplifier 18. Furthermore, when a clock pulse C is applied to the AND gate 20*c*, no output signal is gated therethrough. Hence, the flip-flop 22*c* remains in the reset condition, indicating that a "0" is stored therein. It is therefore seen that the addresses 0–1–0 has been resolved and is recorded in the flip-flop 22.

After the address is resolved the flag bit along drive line 39 is reset. This occurs in the following manner. The clock pulse applied to the AND gate 20*c* is delayed by a short period of time (FIG. 8*q*). The delayed clock pulse C is then simultaneously applied to the AND gate 131 and to the OR gate 132. A second signal applied to the AND gate 131 is produced by the conditioning of the OR gate 133. The OR gate 133 is conditioned since T2 is made positive by the setting of flip-flop 22*b*. The output signal caused by the conditioning of the AND gate 131 is applied to the OR gate 185. The OR gate 185 is conditioned thereby energizing driver S174. The output of driver S174 (FIG. 8*s*) is applied to the transistor switch 169. The second signal applied to the transistor switch 169 is the signal SR*b* which emanates from the AND gate 153 of the ring counter 166. When transistor switch 169 is energized, it causes current to be conducted in the drive line 23 to ground.

In like manner, the applying of the delayed clock pulse to the OR gate 132 conditions the latter so as to energize the driver CR175. The driver CR175 is a monostable multivibrator. The energizing of drivers CR175 produces a signal (FIG. 8*s*) whereby current is conducted in line 19 to ground.

After clock C, which has been delayed, is generated, a reset pulse F (FIG. 8*r*) is generated. This reset pulse F is applied to the OR gate 128, the output of which is applied to the driver F123. Driver F123 is also a monostable multivibrator. The driver F123 generates a signal (FIG. 8*t*) which causes current to be conducted in drive strap 39 to ground. Since the information on the plated wire along straps 19 and 23 are both magnetized as "1"s, a signal is induced in the plated wire. Since the information along strap 39 is to be reset to a "0," the signal produced by the driver F (FIG. 8*t*) is timed such that the flag is steered with the fall time of the signal produced by energizing straps 23 and 19. Consequently, the flag bit by which the address 0–1–0 has been resolved is removed by this reset action.

The information along strap 41 of the flag register 12 remains magnetized as a "1" since it is not utilized in resolve operation.

LOGICAL OPERATION (READ-WRITE)

In order to perform a random access read and write, the flip-flops 22*a*, 22*b* and 22*c* of the address register 22 are reset to the "0" condition. In like manner, the ring counters 164, 165 and 166, and positions 21, 23 and 25 are reset.

The address for which a read or write cycle is to be performed in the random access mode, is stored in the address register 22. The address emanates from the central processor (not shown). Let us assume that information is to be written in the address 0–1–0. Accordingly, the flip-flop 22*a* will remain reset (i.e., stores a "0"), flip-flop 22*b* is set (i.e., stores a "1") and flip-flop 22*c* also remains reset (i.e., stores a "0"). The search to find the most significant number 0 of the address 0–1–, for a random access read or write, is logically accomplished in the following manner.

The address-search is begun by first energizing drive line 39 to prepare it for a bit steering operation. This is accomplished by producing an address-search signal which is applied to the OR gate 128 in order to condition the latter. The output of the conditioned OR gate 128 is applied to the driver F123. This causes current to flow in the drive line 39 to ground. It will be recalled that the "0" magnetization of the plated wire along 39 was obtained during the reset of the flag register 12 during the associative address search. The "0" vector is rotated back to a "1" before the random access read-write cycle begins by energizing straps 41 and 19 with a signal whose leading edge falls within the gate signal shown on FIG. 8*t*. Circuitry for this operation is well known and was not included in order to keep the drawing relatively simple. Hence, the "1" information vector is rotated to an angle less than 90° and is prepared to be switched in the event that bit steering current is developed in the plated wire.

After the flag register is prepared by energizing the drive line 39, the drive straps 43*b* and 21 are simultaneously energized. The reason why drive strap 43*b* is energized instead of 43*a* is that the search requires that the first bit which is looked at be a "0." Strap 43*b* is energized by the energizing of transistor switch 159. This requires that the signal SR1C be generated. The signal SR1C is generated as the output of the AND gate 146 (FIG. 7). This requires that three signals be present, namely, F1, S1 and the address search signal. Signal F1 is produced by the flip-flop 22*a* and is high when the latter is reset and stores a "0." The address search signal is produced by the central processor (not shown). The signal S1 is produced by the output of the flip-flop 134*a* of the ring counter 164 (FIG. 7). It will be recalled that the ring counter 164 is returned to its initial state before the random access operation is begun. Hence, the signal SR1C is produced. The driver SA157 must also be energized in order to close the transistor switch 159. The driver SA157 is energized by the delayed addressed search signal. The output of the driver circuit SA157 and the signal SR1C applied to the transistor switch 159 causes current to flow in the strap 43*b* to ground.

It will be recalled that the positions under straps 21, 23 and 25 were reset. This is accomplished by energizing straps 41 and 19, first, in response to a general reset signal and energizing the straps 21, 23 and 25 in response to a delayed general reset signal. This enables the trailing edge of the first signal to effect a zero reset direction.

Since each of the straps 21, 23 and 25 of the reference straps 15 are all magnetized as "0"s any one can be read out together with strap 43*b*. Accordingly, the line 21 is energized for the following reason. The ring counter 166 produces the output signal SR*a* (FIG. 7) since when counter 165 is reset the first position reads a "1." The transistor switch 167 is energized by means of the signal SR*a* in conjunction with the output of the driver S174. The driver S174 is energized by the conditioning of the OR gate 185 when the delayed addressed search clock signal is applied thereto. Thus, when straps 23 and 43*b* are simultaneously energized no output signal is produced and hence the flag register 12 is not changed (i.e., the information along strap 39 remains magnetized as a "1").

The flag register 12 is again prepared to be switched upon searching for the second most significant figure of the address 0–1–. The address search signal is applied to the OR gate 128 which causes the driver F123 to be energized. When the driver F123 is energized it causes current to flow through the strap 39 to ground. In this manner, the "1" vector is rotated to an angle less than 90° and is prepared to be switched in the event that bit steering current is generated in the plated wire.

Shortly after the energizing of strap 39, straps 45*a* and 23 are again simultaneously energized. The strap 45*a* is energized in the following manner. A delayed addressed search signal is applied to the driver SA157. The output of the driver SA157 is applied to the transistor switch 160. A second signal SR2 is also applied to the transistor switch 160. The signal SR2 is produced by the ring counter 164 (FIG. 7). Thus, when the address search signal is applied to the OR gate 136, the latter is conditioned and the output thereof is applied to the AND gate 135. Simultaneously, the address search clock signal is applied to a second input of the AND gate 135. When both signals are present, the AND gate 135 is conditioned thereby stepping the ring counter 164 and setting the flip-flop 134*b* and resetting flip-flop 134*a*. The setting of flip-flop 134*b* of the ring counter 164 produces the signal S2. The signal S2 is applied both to the AND gates 140 and 142. However, the address inserted into the address register 22 (FIG. 6) has the address 0–1–0 inserted therein and the "1" sets the flip-flop 22*b* thereby causing the output T2 to go high. Therefore, the AND gate 140 is conditioned since the signals S2, T2 and the address search signal are all high. The output of the AND gate 140 is applied to the OR gate 141, thereby producing the signal SR2. The application of these two signals to the transistor switch 160 energizes the drive line 45*a* which causes current to flow therethrough to ground.

The strap 23*b* is again energized by means of the driver S174 and the SR*a*. Driver S174 is energized by the output of the OR gate 185 which is conditioned by the next addressed search signal. The output of the driver S174 is applied to the transistor switch 169. A second signal is applied to the transistor switch TS167 and comprises a signal SR*a*. The signal SR*a* is produced by the ring counter 166 in the manner above described.

Since the output of the strap 45*b* and that of the strap 23 produces a cancelling effect, the flag register 12 along strap 39 remains magnetized as a "1."

In order to search the last digit 0 of the address 0–1–0 the flag register 12 is again energized. This occurs when the next address search signal is applied to the OR gate 128 thereby conditioning the latter. When the output of the OR gate 128 is applied to the driver F123, an output signal is produced which causes current to flow in strap 39 to ground. In this manner, the flag register is prepared to record a match or mismatch signal.

In order to search for a "0" information bit, a strap 47*b* is simultaneously energized with the strap 23. The strap 47*b* is energized in the following manner. Transistor switch 163 is energized simultaneously by the signal SR3C and the output of the driver SA157. The signal SR3C is obtained from the output of the AND gate 148 (FIG. 7). The output SR3C is obtained when the address search signal, and the signals S3 and F3 are all high. The signal F3 is high since the flip-flop 22*c* (FIG. 6) is reset or in the "0" state. The address search signal is high since the address search is being performed. The signal S3 is high since the applying of the address search to the OR gate 136 as well as to the AND gate 135 causes the latter to be permissed thereby stepping ring counter 164 to the next state. This causes the flip-flop 134*c* to be set thereby producing the output S3.

The energizing of the strap 47*b* and the strap 23 produces no output since the information stored in the plated wire along the straps are magnetized oppositely. Hence, the flag register 12 along strap 39 remains magnetized as a "1" indicating that a match has been recorded for the address search 0–1–0. In order to perform a random access read cycle operation, the information along straps 39 and 41 of the flag register 12 are simultaneously energized. Straps 39 and 41 are simultaneously energized by the respective energizing of the driver F123 and driver F124. The driver F123 is energized by the output of the OR gate 128 which is conditioned by the read/write on match signal. In like manner, the driver FR124 is energized by the output of the OR gate 125 which is energized by the read/write on match signal. Since the information along the straps 39 and 41 are both magnetized as "1"s, a bipolar pulse is induced in the plated wire. This bipolar pulse causes the data of the memory (not shown) to oscillate above its quiescent 45° point in the manner described in FIG. 2 to enable a read operation to be performed. Similar the induced bipolar pulse in the plated wire may be used to provide a write operation in the manner described in FIG. 2. The logic has not been included in the description in order to keep discussion as simple as possible since it is readily apparent to those skilled in the art of logical design. It should be further understood that the logic provided in the above discussion is by way of example only and other arrangements may be used without departing from the spirit of this invention.

In summary, this invention relates to a computer arrangement which operates both in the associative and random access memory mode. In the associative memory mode, the arrangement provides a technique for locating match and mismatch information in accordance with a required search criterion. In addition, the technique includes means to resolve or determine the addresses of the locations which store matched information. A further high light of this invention is that the search cycle including the resolve steps may be performed entirely within the memory plane (i.e., the magnetical components of the memory) while utilizing only a single amplifier. In other words, a great saving in components and complexity is obtained by performing the match and resolve operation within the memory plane so that there is a need for only a single amplifier instead of a plurality of amplifiers. It should also be noted that the memory plane utilized in this invention will be made up of homogeneous elements. Thus, the plated wires and drive straps are the same throughout the system.

In the random access mode, the structure required for the search and resolve operation may be conveniently utilized to obtain the word position for a given address. This is done by utilizing the given address for a required word as the search criterion. Accordingly, a single match is obtained for the required address. When the required address is found, the flag register may be utilized to perform the read or write cycle. The addressed search may also be performed entirely within the memory plane except that one sense amplifier is required for each bit that is read out in parallel for a read operation whereas no amplifiers and no bit drivers as used in conventional plated wire memories are required for the write operation.

In addition to the electrical advantages summarized above, the invention also provides a noted mechanical advantage. Only one side of the memory array is connected to the external electronics whereas the remaining three sides of the array are terminated in a simple network, e.g. a ground buss.

Obviously, many modifications of this invention not described herein will become apparent to those already skilled in the art from a reading of this disclosure. Therefore, it is intended that the matter contained in the foregoing description and the accompanying drawings be interpreted as illustrative and not limitative, the scope of the invention being defined in the appended claims.

I claim:

1. The combination comprising:

a. a group of memory storage elements adapted to store data and arranged into data storage elements with accompanying complementary storage elements;

b. means for arranging said group into subgroups each of which has an address designation;

c. a first data register;

d. means connected to said register to apply a criteria signal to said first group for searching for required information;

e. a second data register;

f. data storage means which are arranged into an address tree in ascending order and a corresponding tree in descending order alternately connected to said second data register for applying an signal to said memory storage elements when operating in the random access mode for selecting a desired address location.

2. The combination in accordance with claim 1 wherein resolve means are coupled to said group of memory elements for determining the addresses of the information which satisfies said criteria signal.

3. The combination in accordance with claim 1 wherein means are coupled to said group of memory elements for reading out or alternatively writing in information in the address corresponding to said address signal.

4. The combination comprising:

a. a first group of magnetic storage elements, one half of said elements being divided into data storage elements and the remaining half being divided into complementary data storage elements and first drive means juxtaposed to each said first group storage element;

b. a second group of magnetic storage elements coupled to said first group, and second drive means juxtaposed to each said second group storage element;

c. a third group of magnetic storage elements coupled to said first and second group and third and fourth drive means juxtaposed to said third group storage elements, d. means for simultaneously energizing select ones of said second drive means and select ones of said first drive means;

e. means for energizing said third drive means just prior to the energizing of said selected first and second drive means, said magnetic storage elements of said third group juxtaposed to said third drive line being thereby conditioned to detect match or mismatch information in said first group of storage elements.

5. The combination in accordance with claim 4 wherein a fourth group of data storage elements are coupled to said first, second, and third storage elements, said fourth group of elements being divided into storage elements and corresponding complementary storage elements, said storage elements being arranged into a binary address tree in ascending order and said complementary elements in descending order, and fifth drive means juxtaposed to said fourth group of data storage elements.

6. The combination in accordance with claim 5 wherein said third drive line and the fifth drive line juxtaposed to the storage elements of said address tree are simultaneously energized beginning with the most significant address digit of the address tree and ending with the least digit of the address tree.

7. The combination in accordance with claim 6 wherein a selected one of said second drive lines is energized just prior to the energizing of said selected first drive line and said selected fifth drive line.

8. The combination in accordance with claim 7 wherein a fifth group of storage elements is coupled to said four storage groups, a sixth drive line being juxtaposed to said fifth group storage elements.

9. The combination in accordance with claim 8 wherein the second drive line and said sixth drive line are simultaneously energized.

10. The combination in accordance with claim 9 wherein a sensing means is coupled to said five groups, the signal produced by the energizing of said last-mentioned lines resolving the digits of the address contained in said first group of storage elements and which contains the desired matched information.

11. The combination in accordance with claim 5 wherein the fifth drive line juxtaposed to the complementary storage element and a selected second drive line are simultaneously energized.

12. The combination in accordance with claim 11 wherein said third drive line is energized just prior to the energizing of said last mentioned drive lines, the storage elements coupled to said selected drive line being conditioning to receive information relating to match and mismatch address information.

13. The combination in accordance with claim 12 wherein a bias signal is applied to said first drive lines juxtaposed to the storage and complementary elements, said storage elements being thereby conditioned to be read out.

14. The combination in accordance with claim 13 wherein said third and fourth drive means are simultaneously energized, a signal being produced thereby to read out the information stored in a selected address of said first group, and alternatively, the first drive lines coupled to said storage elements and complementary elements being simultaneously energized to record information in said selected address by means of said last produced signal.

15. The combination comprising:

a. A plurality of magnetizable elements arranged in an array;

b. A plurality of signal carrying media disposed in close proximity to said magnetizable elements in order to generate first signals thereat in response to second signals being applied to said signal carrying media;

c. A first group of said magnetizable elements arranged into storage bits with an accompanying complementary bit adapted to store information;

d. a data register;

e. means connected to said register to apply a criteria signal to said first memory group when operating in a search mode;

f. means further connected to said register to receive information from said first group when operating in a random access mode;

g. A second group of magnetizable elements arranged to receive and store information related to addresses of said first group of magnetizable elements;

h. Control means connected to said signal carrying media associated with said second group of magnetizable elements for applying interrogation signals thereto for the purpose of interrogating said second group of magnetizable elements so as to provide an indication of whether particular address information is present or not;

i. A third group of said magnetizable elements coupled to said control means to receive signals therefrom in order to detect whether or not said particular address information is present in said second group of magnetizable elements in order to further provide a signal for reading data from said first group of magnetizable elements which correspond to said particular address information.

16. The method of searching in a memory device for required information in a search mode and for reading out and writing information into said memory in a random access mode by the steps of, a. generating signals indicative of whether information stored in said memory corresponds or does not correspond with a certain criteria;

b. generating further signals by resolving the addresses of the memory locations which matches said criteria; said last mentioned signals indicating the binary state of said memory location address, and alternatively, c. generating a signal corresponding to required address location of said memory, said address location being a search criteria;

d. applying said last generated signal to said memory device to read out the information stored in said required address in one mode of operation;

e. applying said last generated signal to the storage elements of said memory in conjunction with variable width pulses for recording data and complementary data bits in a second mode of operation.